United States Patent [19]

Hideaki

[11] Patent Number: 5,535,017
[45] Date of Patent: Jul. 9, 1996

[54] PARALLEL IMAGE PROCESSING SYSTEM

[75] Inventor: Kashiwagi Hideaki, Kangawa, Japan

[73] Assignee: Fuji Xerox Co., Ltd., Tokyo, Japan

[21] Appl. No.: 900,756

[22] Filed: Jun. 19, 1992

Related U.S. Application Data

[63] Continuation of Ser. No. 595,841, Oct. 10, 1990, abandoned.

[51] Int. Cl.⁶ .................................................. H04N 1/40
[52] U.S. Cl. ........................... 358/444; 358/404; 358/448
[58] Field of Search ................................. 358/444, 448, 358/450, 483

[56] References Cited

U.S. PATENT DOCUMENTS

| | | | |
|---|---|---|---|
| 4,760,458 | 7/1988 | Watanabe et al. | 358/452 |
| 4,814,798 | 3/1989 | Fukae et al. | 358/483 |
| 4,910,607 | 3/1990 | Kita et al. | 358/448 |
| 5,041,918 | 8/1991 | Ishida et al. | 358/442 |
| 5,091,790 | 2/1992 | Silverberg | 358/407 |

*Primary Examiner*—Edward L. Coles, Sr.
*Assistant Examiner*—Thomas L. Stoll
*Attorney, Agent, or Firm*—Finnegan, Henderson, Farabow, Garrett & Dunner

[57] ABSTRACT

Print image data produced by external equipment such as a personal computer is temporarily stored in a page buffer of an IOCP. The print image data stored in the page buffer is divided into a plurality of parts so that each divisional part can be transferred to another page buffer of a main control circuit within a scan return period of a scanner. Image data to be transferred to the page buffer of the main control circuit is selected by a multiplexer between the print image data and copy image data from the scanner. Thus, the print image data and copy image data is processed by an image processing system in a parallel manner.

5 Claims, 4 Drawing Sheets

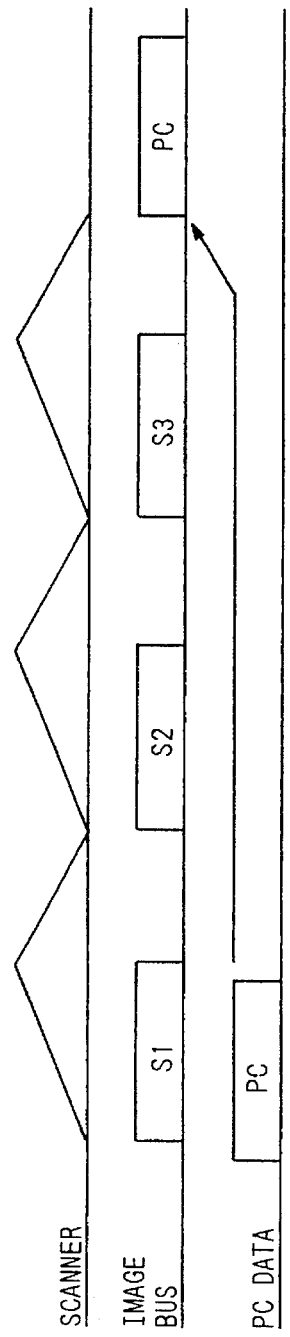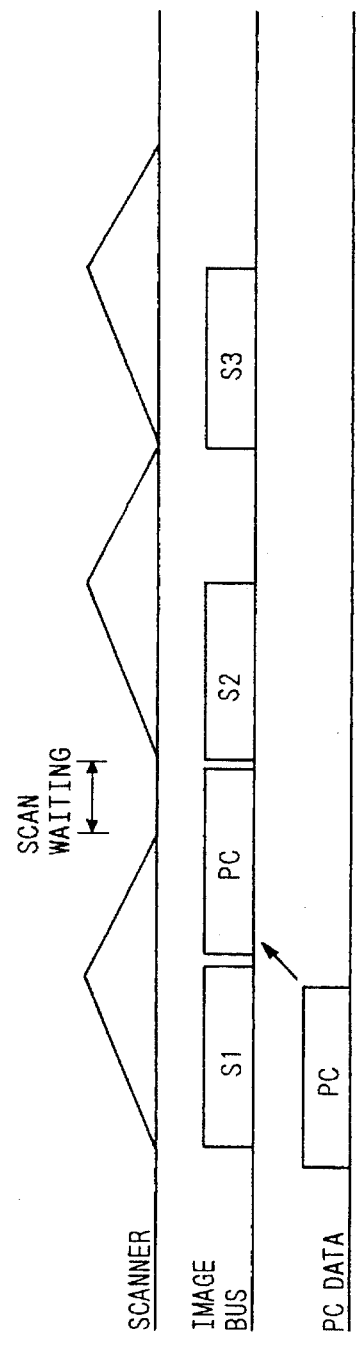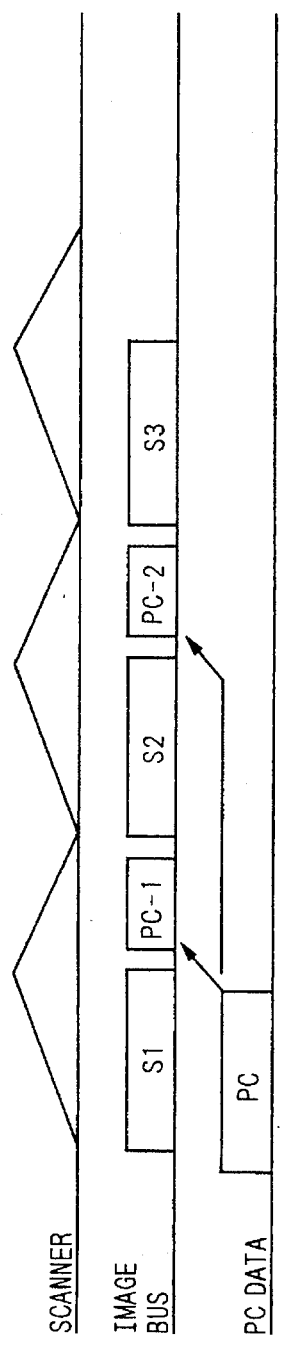

PARALLEL IMAGE PROCESSING SYSTEM

This application is a continuation, of application Ser. No. 07/595,841, filed Oct. 10, 1990, now abandoned.

BACKGROUND OF THE INVENTION

1. Field of the Invention

This invention relates to a parallel image processing system adapted for multifunctional copying machines, in which image data obtained by an image reading unit and image data provided from external equipment are processed in a parallel manner.

2. Discussion of the Related Art

FIG. 5 shows one example of a conventional digital image processing system.

In the digital copying machine, an IIT (image input terminal) 43 reads an original with a CCD sensor or the like, and converts analog values of the resultant video signal into digital values. The digital signal is converted into binary data, being processed (for instance corrected and edited), by an IPS (image processing system). And an IOT (image output terminal) controls the on/off state of pixels according to the binary data to output a mesh-point image, thereby to reproduce the original's image.

External equipment, such as a PC (personal computer) and a facsimile machine, may be connected to the above-described digital copying machine to share the IOT 46. In this case, as shown in FIG. 5, the IOT 46 is separated from the IIT 43, and a change-over unit 45 is provided therebetween so that the IOT 46 is connected through the change-over unit 45 to the IIT 43, the PC 41 or the facsimile machine 44. Thus, the binary data provided by the PC 41 or the facsimile machine 44 can also be output similarly as in the case of the binary data provided by the IIT 43. In general the PC 41 handles code data, and therefore the PC 41 applies the binary data obtained by bit-mapping the code data to the IOT 46. The facsimile machine 44 supplies the decoded binary data to the IOT 46.

There have been available, as described above, digital image processing systems in which a printer is shared by a digital copying machine, PC, facsimile machine, etc. However, these conventional systems are not so high in productivity, because the elements thereof operate individually and exclusively.

Even in the case of processing both of image data from a scanner and image data from external equipment using a single image bus by giving higher priority to the scanner and taking in the image data from the external equipment during a return period of the scanner, the reading operation from the external apparatus interferes with the operation of the scanner, thereby impairing the copying performance.

To make a single machine available to accommodate a number of inputs, it is conceivable to assign a processing unit to each input. However, such an arrangement runs counter to the efforts in implementing smaller and inexpensive machines.

Particularly, increase in processing speed of copying operations and increasing volume of image data from external equipment due to improvement in the picture quality of images has made it all the more difficult to process the image data from the external equipment during a return period of the scanner.

SUMMARY OF THE INVENTION

The present invention has been made in view of the above circumstances and has an object of providing a parallel image processing system capable of parallel processing of image data input from external equipment of a comparatively low speed while maintaining high copying performance.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the parallel image processing system of this invention processes in a parallel manner both of image data from an image reading unit and image data from external equipment and outputs them to an image output unit, and comprises: transfer control means for controlling transfer of image data from the external equipment; means for switching an image data input source between the image reading unit and the external equipment; means for compressing the image data fed from the switching means; means for storing the compressed data from the data compressing means; expanding means for expanding the compressed data to recover the original image data and providing the recovered image data to the image output unit; and control means for controlling the input switching operation, compressing/expanding operations, and storing operation.

The parallel image processing system according to the present invention can receive image data from the external apparatus through the transfer control means during a return period of the scanner while receiving image data from the scanner, by controlling the switching means with the control means. In this case, the image data is transferred after being divided into a size transferable by the data transfer control means within the scan return period, and this enables parallel image processing to be performed without interfering with the regular operation of the scanner.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention.

In the drawings,

FIGS. 3(A) through 3(C) are diagrams illustrating difference among various modes of processing PC data;

DETAILED DESCRIPTION OF THE PREFERRED EMBODIMENT

An embodiment of the present invention will now be described with reference to the accompanying drawings.

Figure 1:
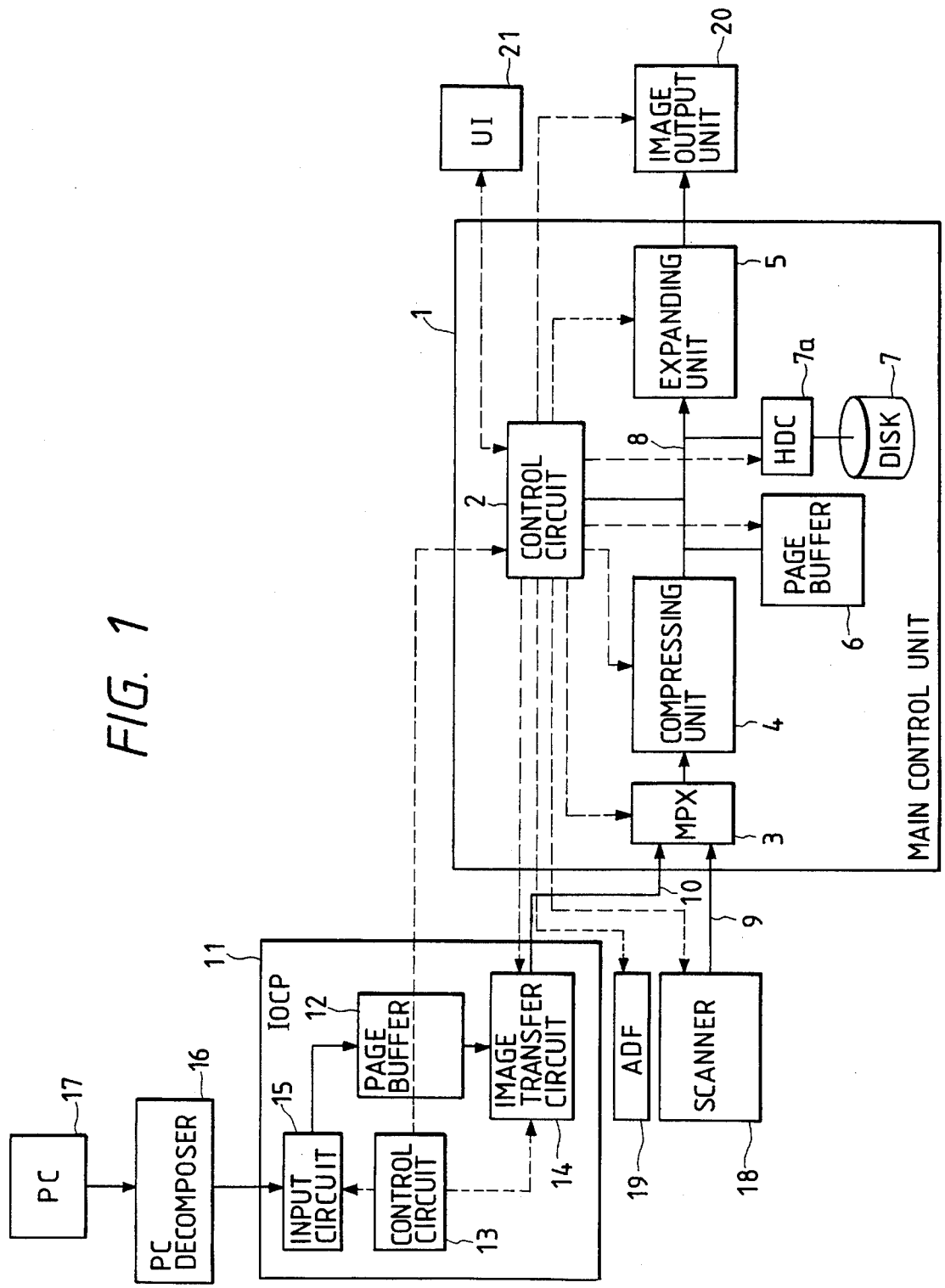
FIG. 1 is a block diagram depicting a parallel image processing system according to an embodiment of the present invention.

FIG. 1 is a block diagram showing the construction of a parallel image processing system according an embodiment of the invention.

As shown in FIG. 1, a main control unit 1 comprises: a multiplexer for switching between the image data of a scanner 18 and the image of external equipment such as a PC and facsimile machine; a compressing unit 4 for compressing the image data; an expanding unit 5 for restoring the compressed data into the original image data; a page buffer 6, a large amount of data storing memory, such as a disk 7, and a control circuit 2.

A scanner 18 is an image reading unit for reading an original with a CCD sensor or the like. The scanner 18 gives offset adjustment and gain adjustment to the signal thus read, converts analog image data into digital image data, and performs gap correction and shading correction, etc. for the latter. In the case of reading a colored original, the scanner 18 obtains color-separated image data of the primary colors, red (R), blue (B) and green (G). The image data thus obtained are subjected to END (equivalent neutral density conversion), color masking, original size detection, color conversion, UCR (under color removal), black generation, mesh point removal and edge emphasis, TRC (tone reproduction control), compression/ expansion, editing, etc. The scanner 18 is provided with an ADF 19 for automatically feeding an original to be read.

Further in FIG. 1, reference numeral 20 designates an image output unit which is, for instance, a laser printer. The device 20 controls the on/off operation of the laser beam for each pixel according to the binary data obtained from the image data, and can provide an halftone image by mesh points.

In FIG. 1, a PC 17 is an ordinary personal computer, and a PC decomposer 16 develops the code data handled by the PC 17 into a bit map. An IOCP 11 is an external equipment control unit which comprises a PC image data input circuit 15, a page buffer 12, an image transfer circuit 14, and a control circuit 13. In the IOCP 11, the image data in the page buffer 12 are transferred after being divided properly.

An UI 21 is made up Of a display unit, a control panel, etc. for setting/inputting various functions and editing operations, and displaying the contents thereof.

The above-described components of the main control unit 1 operate as follows:

The multiplexer 3 chooses a bus on the input side to be connected to an image bus 8 between a scanner image bus 9 and an IOCP image bus 10.

The compressing unit 4 has two modes, a compression mode and a through mode. In the compression mode, the compressing unit 4 compresses data, for instance, according to an adaptive prediction coding system. In the adaptive prediction coding system, image data is predicted with a plurality of predictors for every eight pixels for instance, and the predictor highest in the percentage of hit is used for prediction of the next eight pixels. In this case, the image signal for which the prediction has come true is represented by "0", and the image signal for which the prediction has not come true is represented by "1".

The expanding unit 5 has an expansion mode and a through mode. In the expansion mode, the compressed image data is restored to the original image data.

The page buffer 6 is to store the image data of several pages of an original. More specifically, the page buffer temporarily stores data to be written in the disk 7 or data read out of the disk 7, or temporarily stores image data to be reproduced without using the disk 7, so that, with the aid of the control circuit 2, the image data is edited, for instance rewritten or replaced, before the reproduction.

The disk 7 is a data storing memory large in capacity to store a large amount of image data compressed. Reading data from or writing data in the disk 7 is controlled by a disk controller (HDC) 7a.

What are stored in the disk 7 are binary or multivalued image data and code data. The code data, being not bit-mapped by the PC decomposer 16, is input through the IOCP image bus 10, the multiplexer 3 and the compressing unit 4. In this case, the compressing unit 4 is in the through mode. The through mode is employed in the case too where the image data is output as it is, being not processed by the compressing unit 4 and the expanding unit 5.

Now, an operation of outputting the image read by the scanner 18 will be described.

In the case where an image outputting operation is carried out only for a single copy with an original read by the scanner 18, the compressing unit 4 and the expanding unit 5 are both placed in the through mode. The image data obtained by reading the original with the scanner 18 is applied, as it is (without being compressed nor expanded), to the image output unit 20 through the scanner image bus 9, the compressing unit 4 and the expanding unit 5. In this case, the following method may be employed: The compressing unit 4 is placed in the compression mode and the expanding unit 5 is placed in the expansion mode, so that the data is compressed and the data thus compressed is applied to the expanding unit 5 directly or after being stored in the disk 7.

In an image outputting operation for a plurality of copies, the compressing unit 4 is placed in the compression mode and the expanding unit 5 is placed in the expansion mode. The image data provided by reading an original with the scanner 18 are compressed by the compressing unit 4 and stored in the disk 7. Thereafter, the image data are read, in the order of pages, out of the disk 7 as many times as the specified number of copies. The image data thus read, are applied after being expanded by the expanding unit 4, to the image output unit 20. Hence, one image reading operation by the scanner 18 results in the output of a plurality of images. For the first copy, the data may be expanded by the expanding unit 5 simultaneously when stored in the disk 7. This method is advantageous in that the image for the first copy can be output earlier, and the time required for the outputting of images can-be reduced as much.

Input reception of the multifunction (concurrent jobs) will now be described.

Figure 2:
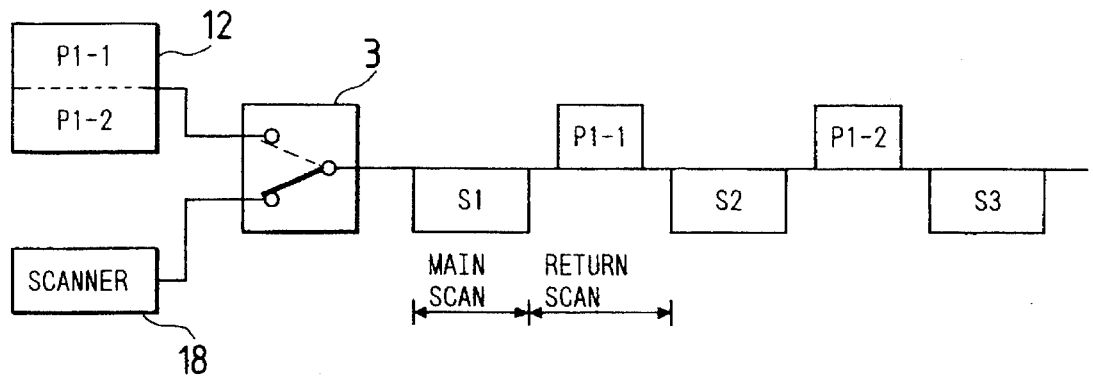
FIG. 2 is a diagram illustrating a multifunction processing.
Figure 5:
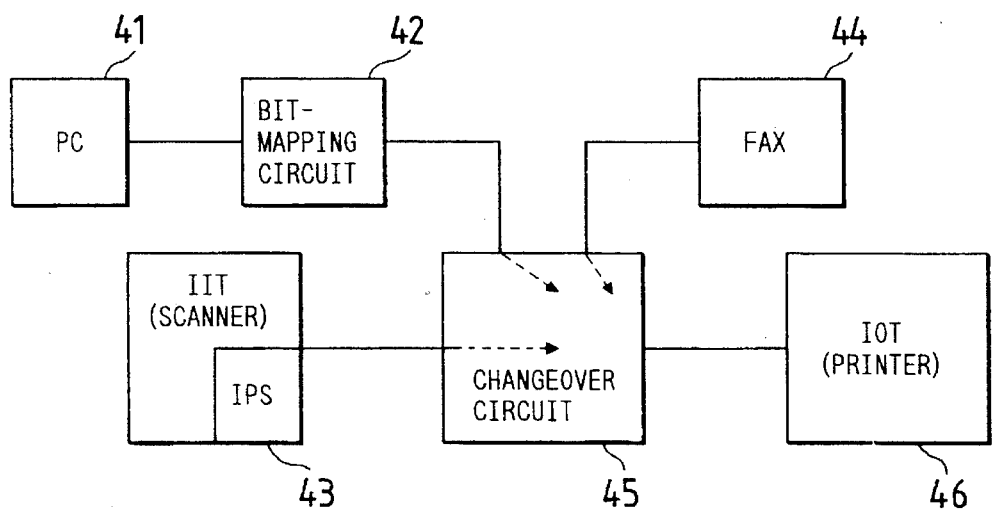
FIG. 5 is a diagram showing an exemplary prior art digital image processing system.

FIG. 2 is a diagram illustrating the processing of the multifunction and FIGS. 3(A) through 3(C) are diagrams illustrating difference among various modes of processing PC data.

In the case where an image outputting operation is carried out with an original read, the operation of the scanner 18 consists of a pre-scan operation and a main-scan operation, each of which includes a scan return operation in which, after reading an original, a scanning member returns to the scan start position. And it should be noted that the image data is output to the scanner image bus 9 only when the original is read in the main-scan operation. In the pre-scan operation, detection of the size of the original, detection of the editing marks, and reading of the area are carried out only within the scanner 18. Hence, fundamentally the scanner image bus 9 is not used during the pre-scan operation and the scan return operation.

In order to process the PC data in a parallel mode, in the invention, the input side bus connection is switched from the scanner image bus 9 to the IOCP image bus 10 by the multiplexer 3 during other than the period of time the original is read in the main-scan operation, i.e., during the pre-scan operation and the scan return operation, or during the pause period of the scanner 18. For instance in the above-described image output operation for a plurality of copies, the scanner 18 is stopped after reading the original. Even during this pause period, an operation of reading data from the disk 7 and an image outputting process are carried out for a "copy job". Therefore, the image bus 8 is used during the execution of such operations.

Hence, while the scanner 18 reads the original in the main-scan operation, or while a copy job for a plurality of copies is performed, even if data is output by the PC 17, the data is temporarily stored in the page buffer 12 of the IOCP 11 until transfer is permitted. It is later transferred when the bus 8 is not used. FIG. 2 shows an example of this processing.

Due to the recent improvement in picture quality of images, the amount of image data has been increased. Therefore, in general, the time of scan return is not long enough to transfer the image data of one page from the page buffer 12 in the IOCP 11. Hence, if the PC data is processed with the top priority given to the process for the scanner image, it may be the case that the process for the PC data is carried out after that for the scanner image, as shown in FIG. 3(A). However, this method is disadvantageous in the case where the number of scanner images is large. That is, before actually processed, PC data are successively input to the page buffer 12, which results in overflow of the page buffer 12.

If an interrupt is caused every scan, the PC data may be processed between the scans. However, in this case, the conventional continuous scan cannot be carried out, and it is necessary to perform time adjustment for processing the PC data between the scans, as shown in FIG. 3(B); that is, it is necessary to give a scan latency time adjusting function to the scanner 18.

In contrast to the above parallel processing, in the present invention, the PC data is divided so that each divisional data can be transferred in the scan return period, as shown in FIG. 3(C). In the figure, one page of PC data is divided into two parts as transfer units. As is apparent from FIG. 3(C), such an arrangement allows one page of PC data to be processed in a plurality of (two) scan return periods by switching the multiplexer 3 alternately in association with the main-scan and scan return operations as shown in FIG. 2, without disturbing the regular scanning operation.

The above operation is outlined below.

(1) Upon transmission of coded data from the PC 17, the PC decomposer 16 receives the coded data and develops it into a bit map, and the IOCP 11 stores the bit map data in the page buffer 12.

(2) control circuit 13 of the IOCP 11 provide a signal to the control circuit 2 of the main control unit 1 to request reception of the PC image data.

(3) control circuit 2 switches the multiplexer 3 to the IOCP image bus 10 if the scanner 18 is not used, and takes in the image data equivalent to one page of an original from the page buffer 12 of the IOCP 11. The image data is first stored in the page buffer 6 through the IOCP image bus 10, multiplexer 3, and compressing unit 4, and then stored in the disk 7. Further, if the image output unit 20 is not busy, the control circuit 2 causes the image data to be read from the disk 7 and sends it to the image output unit 20 through the page buffer 6 and expanding unit 5.

(3)' If the scanner 18 is being used, the control circuit 2 gives priority to the scanner 18. Upon end of receiving image data from the scanner 18, the control circuit 2 not only instructs the ADF 19 to replace the page but also issues a divisional image transmission permission signal to the IOCP 11 and switches the multiplexer 3 to the IOCP image bus 10. The IOCP 11 then provides the first half of the image data from the page buffer 12 to the IOCP image bus 10. In response thereto, the control circuit 2 causes the PC image data to be stored in the disk 7 through the multiplexer 3, compressing unit 4, and page buffer 6. By repeating the above operation, the latter half of the PC image data is processed.

(4) Upon end of outputting the scanner image data to the image output unit 20, the control circuit 2 causes the PC image data to be read from the disk 7, stored in the page buffer 6, and output to the image output unit 20.

Figure 4:
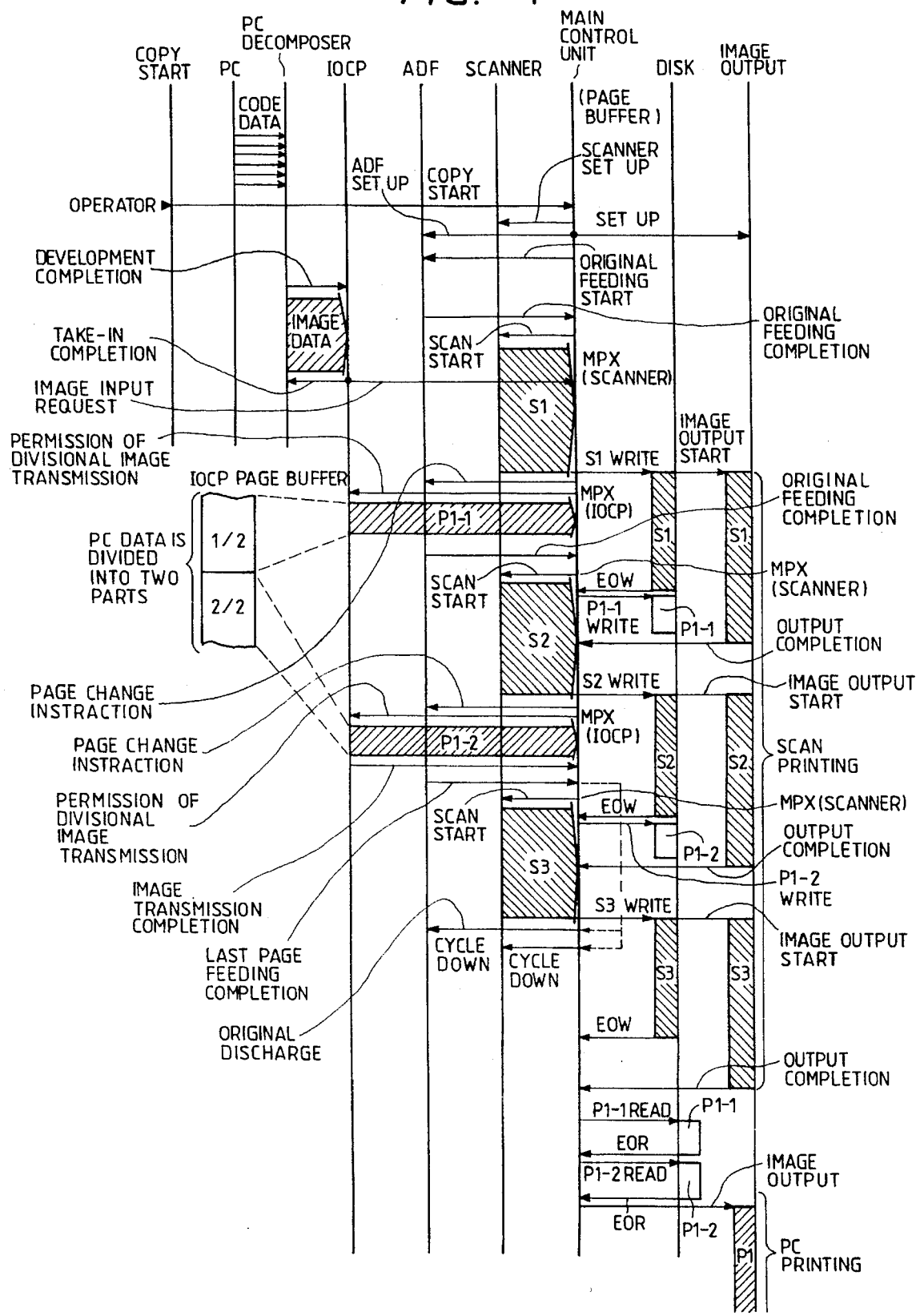
FIG. 4 is a diagram showing an exemplary sequence flow in detail.

FIG. 4 is a diagram depicting details of a sequence flow. The operation of each unit will be described in detail with reference to this sequence flow.

Upon reception of code data from the PC 17, the PC decomposer 16 develops the code data into a bit map. Upon completion of the developing of the code data, the PC decomposer 16 informs the IOCP 11 of the completion of the developing, and transfers the developed image data. The IOCP 11 transmits a reception completion signal to the PC decomposer 16 and simultaneously applies an image input request signal to the main control unit 1.

On the other hand, upon reception of a copy start signal input by the operator, the main control unit 1 applies a setup instruction to the scanner 18, the ADF 19, and the image output unit 10, and causes the ADF 19 to start its operation of feeding an original. In response to an original feeding completion signal from the ADF 19, the main control unit 19 causes the scanner 18 to start its operation, and causes the page buffer 6 to take in scan image data S1 from the scanner 18. Immediately after the scan image data S1 has been taken in by the page buffer 6, the main control unit 1 operates to write the data in the disk 7 and starts outputting the image data to the image output unit 20, and issues an original replacing instruction to the ADF 19.

In the case where an image input request has been made by the IOCP 11 by this time instant, the main control unit 1 causes the multiplexer 3 to choose the IOC image bus 10 to provide an image division transmission permission to the IOCP 11, so that the PC printing image data P1-1, which corresponds to a half page, is loaded into the page buffer 6 of the main control unit 1 from the page buffer 12 of the IOCP 11. The image data division to two parts has been selected because the half page data can be transmitted during the period which elapses from the time instant that the main control unit 1 provides the original replacing instruction to the ADF 19 until the ADF 19 returns the original feeding completion signal to the main control unit 1.

Receiving the original feeding completion signal from the ADF 19 after the taking-in of the PC printing image data P1-1, the main control unit 1 operates to cause the multiplexer 3 to choose the scanner image bus 9 and to cause the scanner 18 to start the scan, thereby to take scan image data S2 in the page buffer 6 similarly as in the above. During this period, the PC printing image data P1-1 of a half page is written in the disk 7 after the scan image data S1.

When the scan image data S3 is stored in the page buffer 6 after the ADF 19 has returned a last page feeding completion signal to the main control unit 1, the scanner 18 and ADF 19 are reset for cycle down. Thereafter, when the operation of writing the data S3 in the disk 7 and the operation of outputting the data to the image output unit 20 have been accomplished, the main control unit 1 operates to transfer the PC printing image data P1-1 and P1-2 from the disk 7 to the page buffer 6, and performs the outputting of those image data to the image output unit 20.

The present invention is not limited to the above embodiment, but various modifications may be possible. For example, although in the above embodiment the PC image data is stored in the disk 7 through the IOCP 11 in the absence of image data being output from the scanner 18 or of image data being read from the disk 7 to the image output unit 20, it may be possible to connect a facsimile machine, a WS (work station) or a like device to the IOCP 11 and store image data of such a device in the disk 7. Any free time other than the scan return period may of course be utilized. One of such free times is a period during the compressing or expanding operation, because during such a period after a predetermined volume of data has been read the image bus 8 is not used. The size of the divided image data to be transferred from the IOCP 11 may be adjusted in accordance with the length of such a period or the image data may be transferred without being divided.

As is apparent from the foregoing description, in the present invention, data from external equipment, such as PC data, is transferred during the scan return period by dividing the data, thereby allowing the reception and processing of the external data concurrently with the regular scanning operation without impairing the scan printing (copying) performance. Further, the external data is processed by switching the data input source from the scanner to external equipment only during scan return periods, thereby achieving the parallel processing using only one image bus and contributing to reduction of system running cost.

The foregoing description of preferred embodiments of the invention has been presented for purposes of illustration and description. It is not intended to be exhaustive or to limit the invention to the precise form disclosed, and the modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image processing apparatus for processing in a parallel manner copy image data produced by an image reading unit and print image data produced by an external apparatus and providing the processed image data to an image output unit, said image processing apparatus comprising:

transfer control means for controlling transfer of the print image data received from the external apparatus;

means for switching image data between the copy image data from the image reading unit and the print image data from the transfer control means;

means for compressing the image data provided from said switching means;

means for storing the compressed image data from the compressing means;

means for expanding the compressed image data and providing the expanded image data to the image output unit; and control means for controlling the switching means, compressing means storing means and expanding means;

wherein the control means controls the switching means to allow the print image data to be input from the transfer control means during a scan return period of the image reading unit which is reading an original.

2. The apparatus according to claim 1, wherein the transfer control means divides the print image data of one page into a plurality of parts and transfers the print image data on a part basis.

3. An image processing apparatus comprising:

means for receiving print image data from an external apparatus;

means for reading an image of an original by reciprocating scan to produce copy image data;

means for storing the print image data and copy image data;

means for switching image data to be provided to the storing means between the print image data from the receiving means and the copy image data from the reading means;

means for outputting the image data read from the storing means as a hard copy; and means for controlling the switching means to allow the print image data to be provided to the storing means during a scan return period of the reading means which is reading an original.

4. An image processing apparatus comprising:

means for receiving print image data from an external apparatus;

a data buffer for temporarily storing the print image data provided from the receiving means;

means for reading an image of an original by reciprocating scan to produce copy image data;

means for switching image data between the print image data from the data buffer and the copy image data from the reading means;

means for compressing the image data provided from the switching means;

means for storing the compressed image data from the compressing means;

means for expanding the image data read from the storing means;

means for outputting the expanded image data from the expanding means as a hard copy;

means for dividing the print image data of one page stored in the data buffer into a plurality of parts so that each divisional part can be transferred to the storing means within a non-reading scan period of the reading means;

process control means for performing a control operation so that the print image data and the copy image data can be processed in a time divisional manner; and switching control means for controlling the switching means to select the print image data during a period when the print image data is to be transferred from the data buffer to the storing means.

5. The apparatus according to claim 4, wherein while the reading means is not reading the image of the original, the switching control means controls the switching means to select the print image data and the dividing means does not divide the print image data stored in the data buffer.

* * * * *